June 16, 1931.  O. F. RETTIG ET AL  1,810,085
BRAKE TESTING DEVICE
Filed June 21, 1928   2 Sheets-Sheet 1

Inventors
Oscar F. Rettig,
Carl E. West,
By J. Stanley Bunch
Attorney

June 16, 1931.  O. F. RETTIG ET AL  1,810,085
BRAKE TESTING DEVICE
Filed June 21, 1928   2 Sheets-Sheet 2
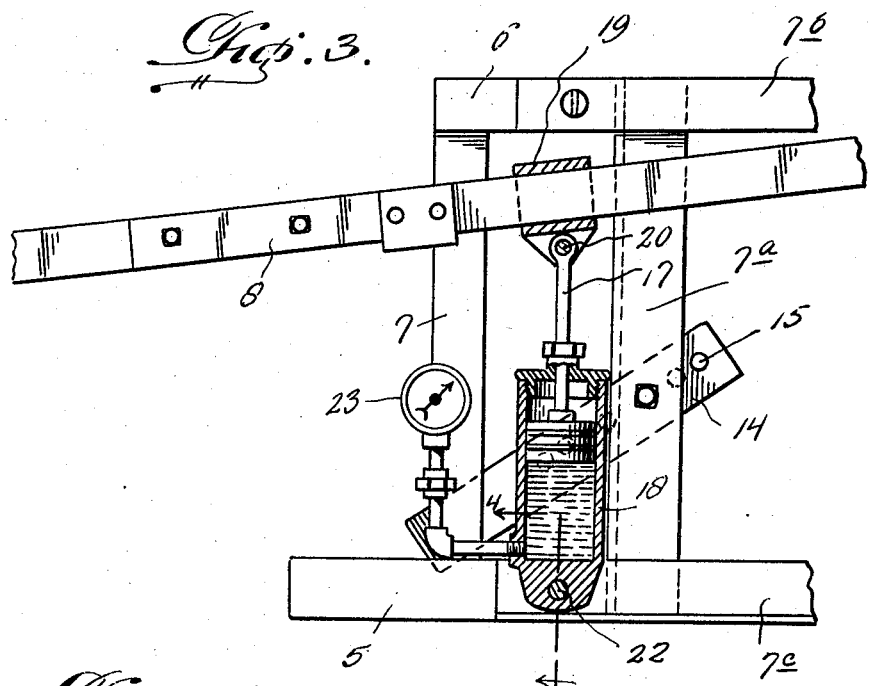
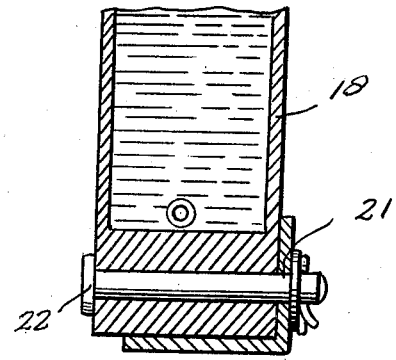
Inventors
Oscar F. Rettig,
Carl E. West,
By Stanley Burch
Attorney Patented June 16, 1931

1,810,085

UNITED STATES PATENT OFFICE

OSCAR F. RETTIG AND CARL E. WEST, OF WATERTOWN, WISCONSIN, ASSIGNORS TO RIGHT-WAY BRAKE TESTER COMPANY, OF WATERTOWN, WISCONSIN, A CORPORATION OF WISCONSIN

BRAKE TESTING DEVICE

Application filed June 21, 1928. Serial No. 287,236.

This invention relates to brake testing devices, and has more particular reference to an improved device for use in testing the action of the brakes upon the wheels of motor vehicles.

The primary object of the present invention is to provide a device of the above kind which is light in weight, simple and durable in construction, efficient in use, and capable of being economically manufactured and readily placed into practical use.

A more specific object of the present invention is to provide a device of the above kind which includes a frame having outwardly extending hooks adapted to grip the tire of an automobile wheel to secure the frame in place upon the wheel, a lever pivoted to the frame, and a hydraulic compressor being interposed between the lever and the frame and provided with a pressure indicating gage, whereby, when the lever is operated to turn the frame and the wheel, the force necessary to turn the wheel while the brake is applied is indicated by the gage.

A further object is to provide for connection of the lever and hydraulic compressor to either end of the frame, whereby these parts may be reversed to permit use of the device for testing the wheel brakes upon either side of an automobile, the same lever being thereby used to turn both wheels in the same direction.

A still further object is to provide tire engaging hooks which are adjustable radially for gripping engagement with the tires of wheels of different sizes.

The invention consists in the novel form, combination and arrangement of parts hereinafter more fully described, shown in the accompanying drawings and claimed.

In the drawings:

Figure 3 is an enlarged fragmentary detail view, partly in side elevation, and partly in vertical section.

Figure 4 is an enlarged fragmentary vertical transverse section on line 4—4 of Figure 3; and Figure 5 is an enlarged perspective view of one of the radially adjustable tire-engaging hooks.

Figure 1:
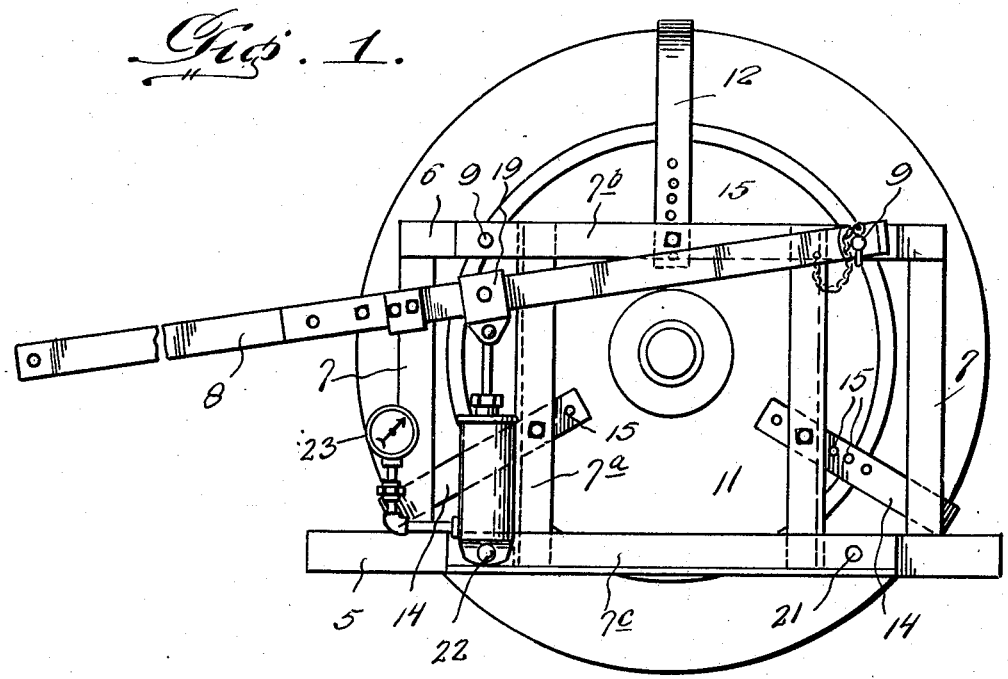
Figure 1 is a side elevational view, showing an embodiment of the present invention in operative position upon an automobile wheel.
Figure 2:
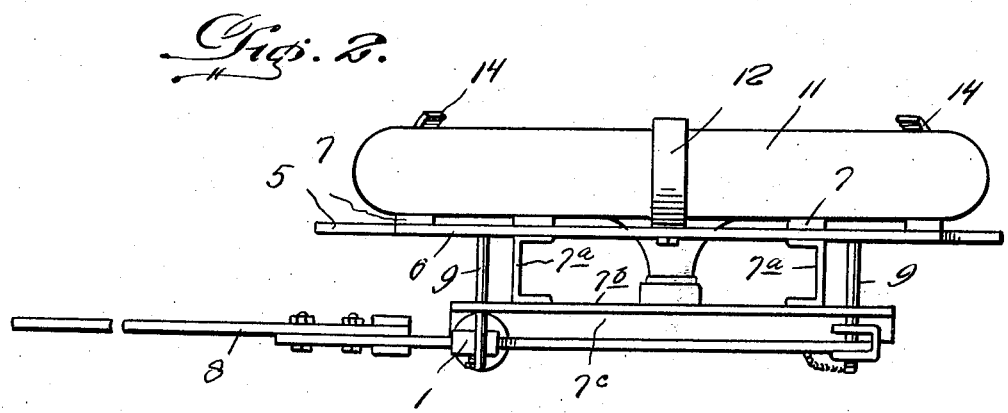
Figure 2 is a top plan view thereof.

Referring more in detail to the drawings, the present invention consists of a suitable open frame preferably including a lower horizontal rail 5, an upper horizontal rail 6, and spaced vertical rails 7 rigidly connecting the horizontal rails adjacent their ends, the rails 5, 6 and 7 being preferably formed of flat strips of strap or bar iron.

Attached to the outer side of the upper and lower rails 5 and 6 are a pair of spaced vertical spacer bars 7a, preferably of channel iron. The upper ends of these spacer bars 7a are rigidly connected by a horizontal bar 7b, and a horizontal angle bar 7c rigidly connects the lower ends of said spacer bars. This completes the frame structure.

The invention further includes a relatively long hard lever 8 having a pivot opening at one end to receive a suitable pivot pin 9, the horizontal bar 7b having the pivot pins 9 near its ends for selective reception of the lever 8, whereby the hand lever 8 may be pivoted to either end of the bar 7c to extend toward and past the other end and to swing in a vertical plane parallel with the plane of the frame and the plane of the vehicle wheel 11. The open frame and spacer bars are used to allow clearance therein for the wheel hub and to permit positioning of the frame flatly against the outer side of the vehicle wheel, as well as to reduce the weight to a minimum.

Carried by the top rail 6 intermediate its ends is a radially adjustable tire-engaging hook 12. Further and similar tire-engaging hooks 14 are adjustably connected to the inner flanges of the spacer bars 7a below their transverse centers so as to be engageable with the tire below the wheel axis, and to be adjustable radially of the tire for moving into or out of gripping engagement therewith.

As shown, the hooks 12 and 14 are provided with longitudinal series of openings 15 for selective reception of a pin 16, whereby the pivotal and adjustable connection of the hooks 14 with the frame is effected. Obviously, the adjustment of the hooks 12 and 14 may be used to accommodate the device to the tires of wheels of various sizes, as well as to permit removal of the device or adjustment of the hooks into gripping engagement with the tire.

A hydraulic compressor of the reciprocating type is provided, having the upper end of its piston rod 17 pivotally connected to the hand lever 8 intermediate the ends of the latter, and having the lower end of its cylinder 18 removably pivoted to the angle bar 7c. As shown, a collar 19 is secured on the lever 8 and has the rod 17 pivoted thereto as at 20. The ends of the vertical upstanding inner flange of the angle bar 7c has pivot openings 21 for selective reception of a removable pivot pin 22 which passes through the lower end of the cylinder 18, whereby the compressor cylinder may be pivoted to either end of the frame. As the pivots 20 and 22 are horizontal and transversely of the frame, the compressor and lever are permitted to assume different angles relative to each other and the frame as will occur when the lever is forced downwardly to lower the piston in the cylinder 18 and turn the frame and the wheel in the brake testing operation. The cylinder 18 has a bottom outlet and carries a pressure gage 23 whose inlet is connected to the outlet of the cylinder. Further, a suitable liquid, such as oil, fills the portion of the cylinder below the piston when the latter is at its upper limit of movement.

In use, the device is applied to the vehicle wheel as shown in Figure 1 and explained above, whereupon a downward pressure is exerted on the lever 8 with the wheel brake applied and the wheel raised off of the ground. The pressure exerted on the lever 8 is indicated by the gage 23 due to the liquid being forced into the same from the cylinder 18. When a proper predetermined pressure is indicated, the wheel should turn, and the brake is adjusted until such is the case, turning of the wheel under a low pressure being prevented by the properly adjusted brake. The lever 8 and cylinder 18 are then pivoted to the opposite ends of the frame, whereupon the same operation is performed on the wheel at the opposite side of the automobile. In this way, the brakes may be quickly and properly adjusted alike for most efficient action in service.

Minor changes may be made without departing from the spirit of the invention as claimed.

What we claim as new is:

1. In a brake testing device for vehicle wheels, an open frame, outwardly projecting hooks carried by the frame and adjustable radially of the wheel for gripping engagement with the wheel tire, a lever pivoted to the frame, a hydraulic compressor equipped with a pressure gage and connecting the lever and the frame, and means to pivotally connect the lever and the compressor to either end of the frame.

2. In a brake testing device for vehicle wheels, an open frame including horizontal top and bottom rails and vertical end rails rigidly connecting said top and bottom rails, a tire gripping hook mounted on the top rail intermediate its ends, said frame further including vertical spacer bars connecting the top and bottom rails, and horizontal bars connecting the upper and lower ends of said spacer bars, further tire gripping hooks mounted on the lower portions of the spacer bars, a hand lever, a compressor equipped with a pressure gage and operatively connected to the lever, and means to pivot the lever and compressor to either of opposite ends of the horizontal bars.

3. In a brake testing device for vehicle wheels, an open frame including horizontal top and bottom rails and vertical end rails rigidly connecting said top and bottom rails, a tire gripping hook mounted on the top rail intermediate its ends, said frame further including vertical spacer bars connecting the top and bottom rails and horizontal bars connecting the upper and lower ends of said spacer bars, further tire gripping hooks mounted on the lower portions of the spacer bars, a hand lever, a compressor equipped with a pressure gage and operatively connected to the lever, means to pivot the lever and compressor to either of opposite ends of the horizontal bars, said last named means embodying the provision of pivot pins at both ends of the upper horizontal bar and pivot openings in both ends of the bottom horizontal bar, and a pivot pin for the compressor adapted for selective reception in the respective openings.

4. In a brake testing device for vehicle wheels, an open frame including horizontal top and bottom rails and vertical end rails rigidly connecting said top and bottom rails, a radially adjustable tire gripping hook mounted on the top rail intermediate its ends, further radially adjustable tire gripping hooks mounted on the frame adjacent the lower portions of the end rails, a hand lever, a compressor equipped with a pressure gage and operatively connected to the lever, and means to pivot the lever and compressor at either of opposite ends of the frame.

In testimony whereof they affix their signatures.

OSCAR F. RETTIG.
CARL E. WEST.